May 20, 1958     D. W. KELBEL     2,835,143
TRANSMISSION
Filed Aug. 30, 1950     6 Sheets-Sheet 5
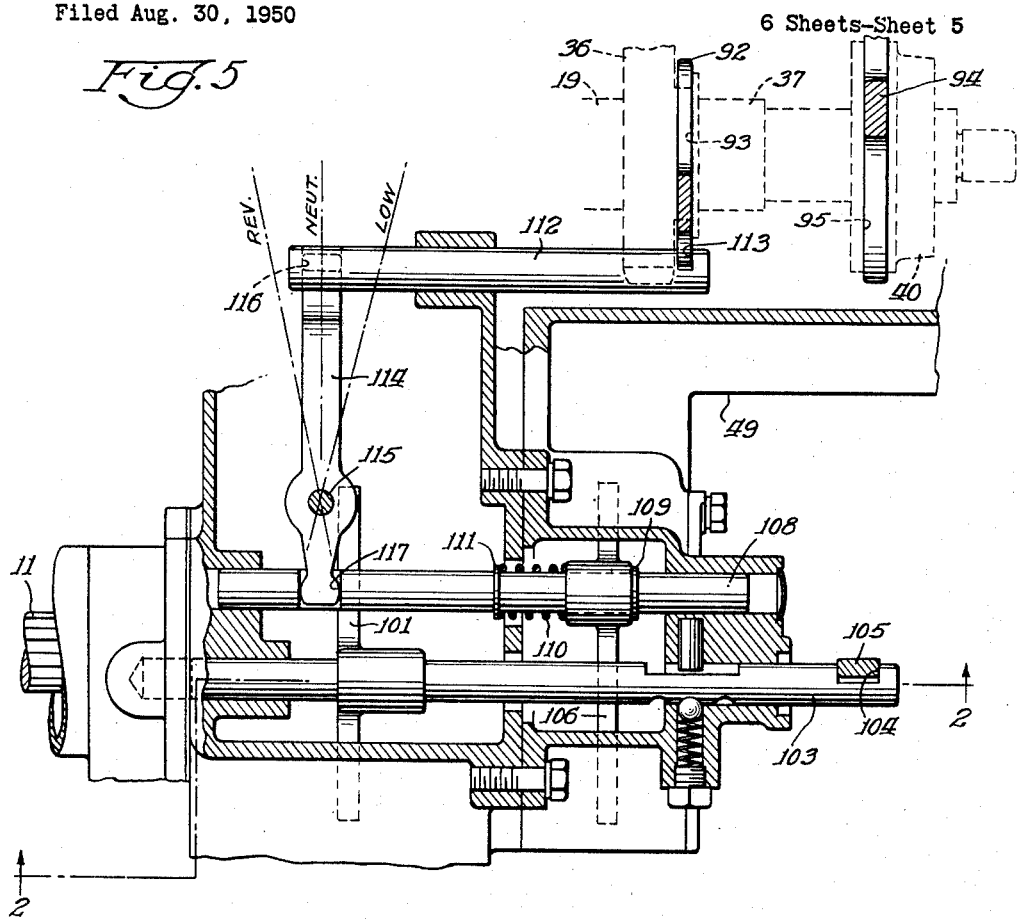
Inventor:
Donald W. Kelbel
By Edward C. Fritzlaugh
Atty.

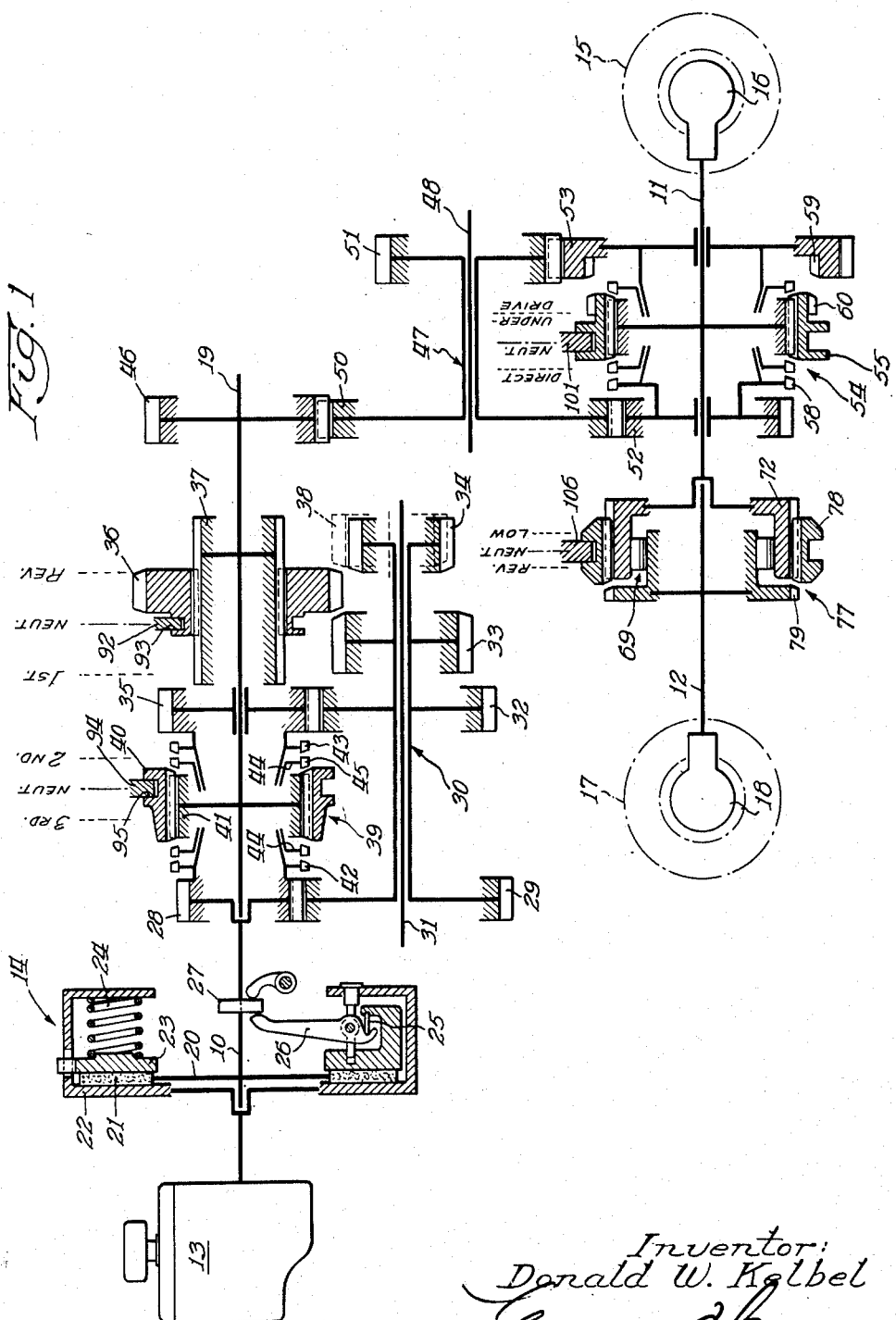

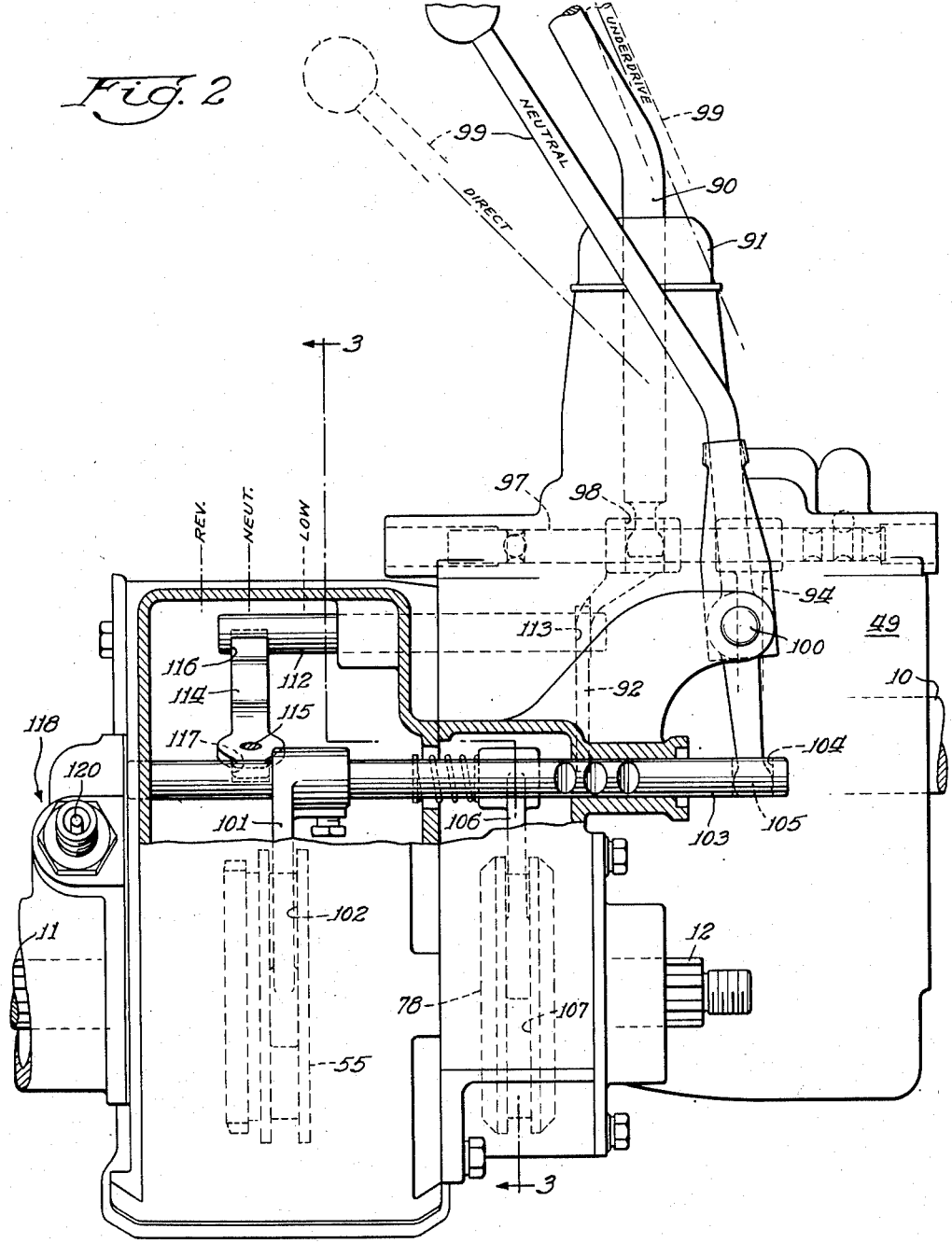

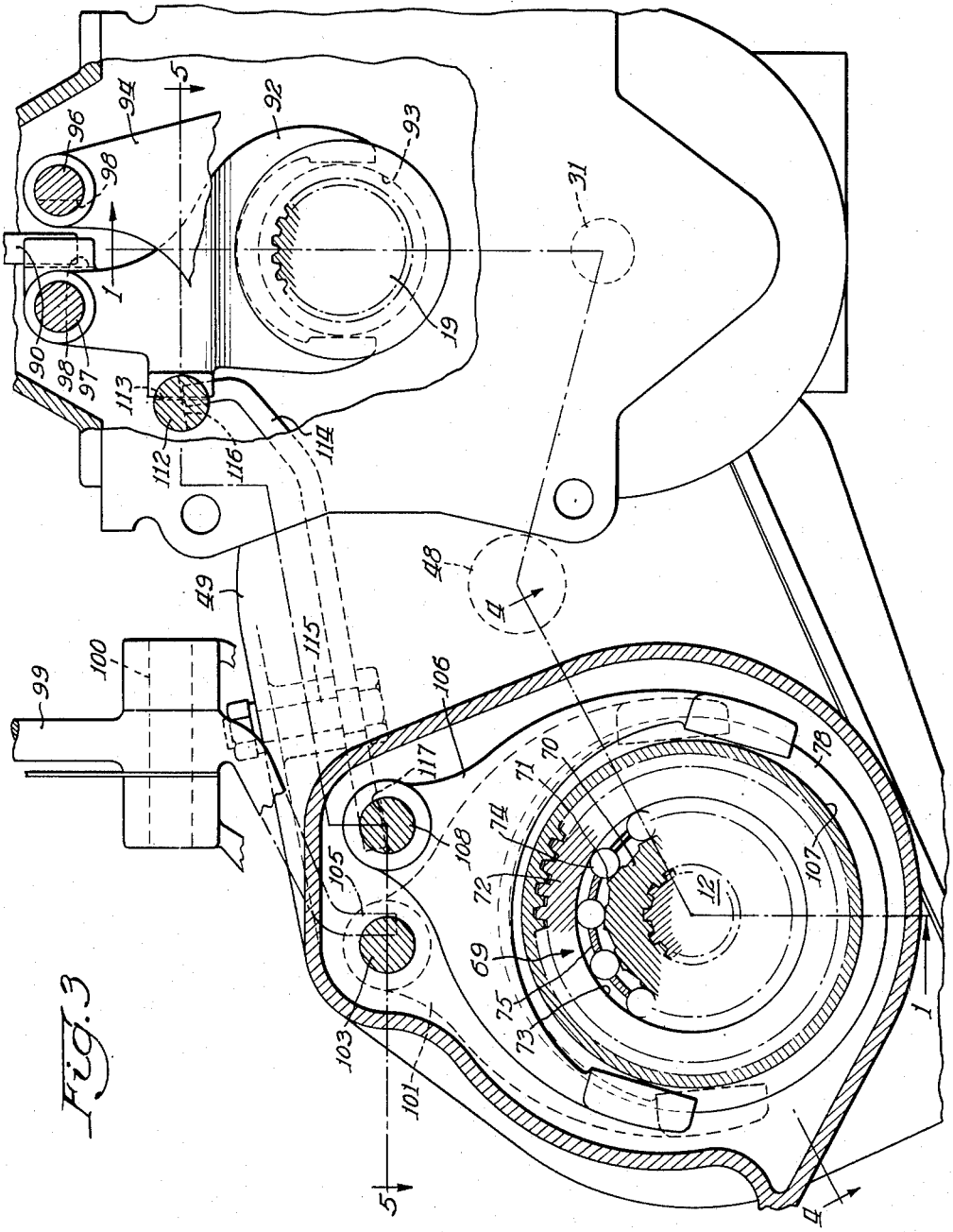

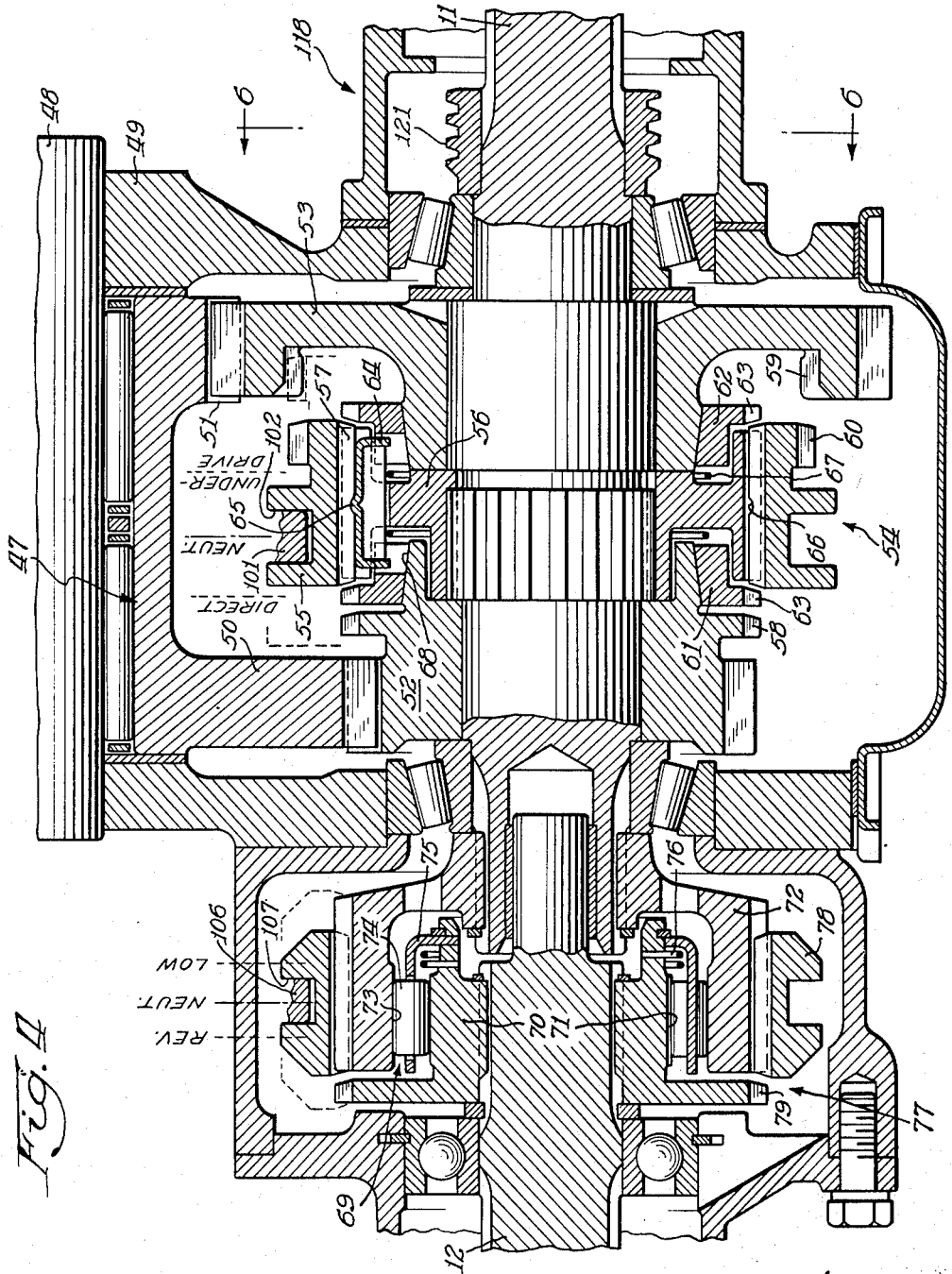

May 20, 1958  D. W. KELBEL  2,835,143
TRANSMISSION
Filed Aug. 30, 1950  6 Sheets-Sheet 6
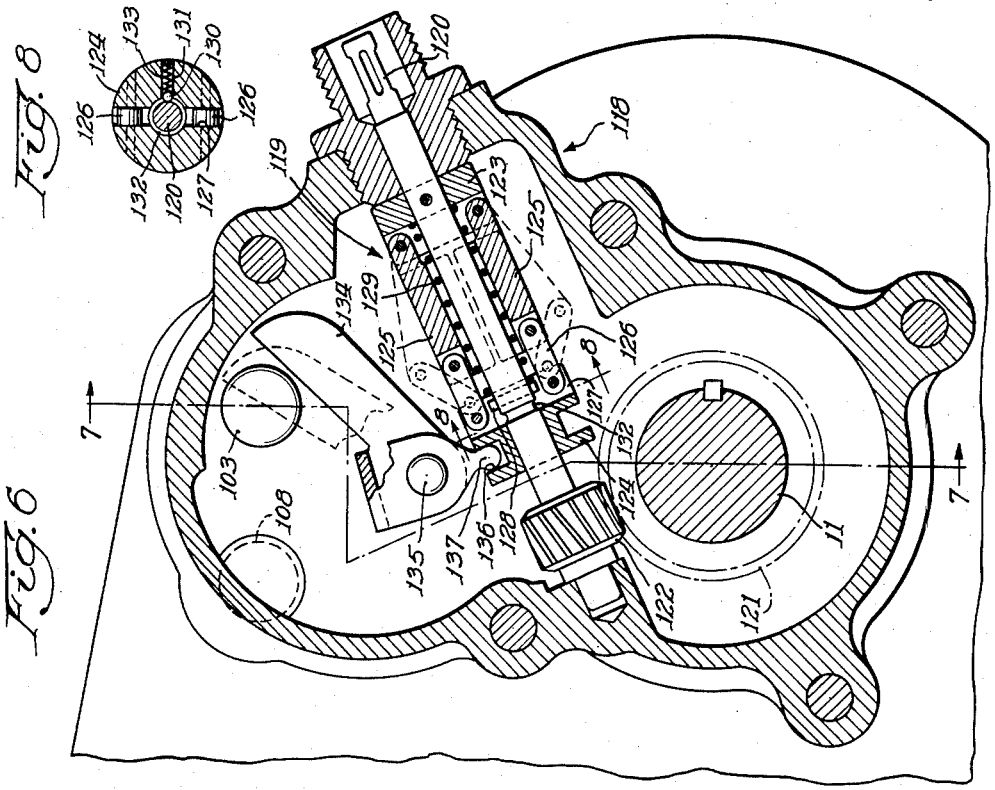
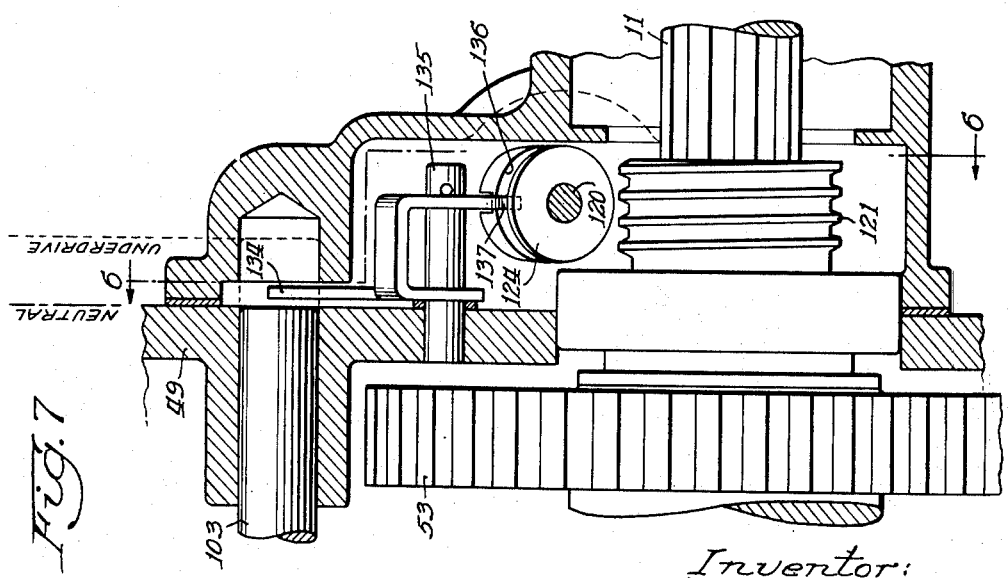
Inventor:
Donald W. Kelbel
By Edward C. Stutzenger
Atty.

United States Patent Office 2,835,143
Patented May 20, 1958

2,835,143

TRANSMISSION

Donald W. Kelbel, Muncie, Ind., assignor to Borg-Warner Corporation, Chicago, Ill., a corporation of Illinois Application August 30, 1950, Serial No. 182,213

5 Claims. (Cl. 74—665)

My invention relates to transmissions for automotive vehicles and more particularly to auxiliary transmission mechanism adapted to be connected with and driven by main transmissions with which automotive vehicles are ordinarily equipped.

It is an object of the invention to provide such an auxiliary transmission mechanism which provides a plurality of different speed ratio power trains connectible in series with the plurality of forward drive power trains of different speed ratio and a reverse drive provided by the main transmission in the vehicle, and it is a more particular object to complete the plurality of power trains in the auxiliary transmission mechanism by means of positive clutches the engaging parts of which are synchronized by synchronizing rings and are blocked from engagement until speed synchronization occurs.

It is another object of the invention to provide, in such auxiliary transmission mechanism, means for connecting both the forward and rear road wheels of the vehicle with the gearing in the auxiliary transmission mechanism, so that both sets of road wheels may be driven, the connection with the front road wheels being through a one-way clutch allowing the front road wheels to travel faster than the rear road wheels. It is a further object to provide a manually operable shift lever for changing the drive through the auxiliary transmission mechanism between its various drives and a shift lever used in connection with the main transmission for changing the drive through the main transmission and to provide in connection with the latter shift lever a positive type clutch for locking the one-way clutch when the latter shift lever is moved so as to complete the reverse drive power train through the main transmission, whereby the front wheels as well as the rear wheels of the vehicle will be driven reversely.

It is contemplated that the auxiliary transmission mechanism shall have relatively high and low speed drives, and it is another object of the invention to provide speed responsive means for preventing a completion of the relatively low speed drive when the vehicle is traveling above a predetermined speed whereby the drive shaft of the main transmission is not rotated at excessive speeds.

The invention consists of the novel constructions, arrangements, and devices to be hereinafter described and claimed for carrying out the above stated objects and such other objects as will become apparent from the following description of a preferred embodiment of the invention illustrated with reference to the accompanying drawings, wherein:

Fig. 1 is a diagrammatic illustration of transmission mechanism embodying the principles of the invention, the view being taken on line 1—1 of Fig. 3 with the parts of the transmission mechanism being shown schematically instead of in full;

Fig. 2 is a side elevational view of the transmission mechanism with certain portions thereof being broken away for better illustration of certain internal parts, with the view being taken substantially on line 2—2 of Fig. 5;

Fig. 3 is a sectional view taken on line 3—3 of Fig. 2;
Fig. 4 is a sectional view taken on line 4—4 of Fig. 3;
Fig. 5 is a sectional view taken on line 5—5 of Fig. 3;
Fig. 6 is a sectional view taken on lines 6—6 of Fig. 4 and 6—6 of Fig. 7;
Fig. 7 is a sectional view taken on line 7—7 of Fig. 6; and
Fig. 8 is a sectional view taken on line 8—8 of Fig. 6.

Like characters of reference designate like parts in the several views.

Referring now to the drawings, the illustrated transmission comprises a drive shaft 10, a driven shaft 11 and a second driven shaft 12. The drive shaft 10 is adapted to be connected to the driving engine 13 of the automotive vehicle in which the transmission is installed through a friction clutch 14. The driven shaft 11 is adapted to be connected to drive the rear road wheels 15 of the automotive vehicle through any suitable conventional differential gearing 16, and the driven shaft 12 is adapted to be connected to drive the front road wheels 17 of the vehicle through any suitable conventional differential gearing 18.

The transmission comprises a conventional three speed forward drive and a single speed reverse drive transmission portion which is drivingly disposed between the drive shaft 10 and an intermediate shaft 19 constituting the output shaft of this particular part of the transmission. The drive shaft 10 constitutes the input shaft for this part of the transmission, and the friction clutch 14 utilized for connecting the drive shaft 10 with the engine 13 is of conventional construction and comprises a clutch disc 20 having annular friction facings 21 enageable between an axially fixed pressure plate 22 and an axially movable pressure plate 23 which is connected with the plate 22 to rotate therewith. The friction disc 20 may be engaged between the plates 22 and 23 under the influence of springs 24 for example, and any suitable means including stouts 25, radially extending levers 26 and a longitudinally movable throwout collar 27 may be utilized for moving the plate 23 away from the plate 22 for the purpose of disengaging the friction clutch 14.

A gear 28 is fixed on the drive shaft 10, and this gear is in mesh with a gear 29 which is part of a gear cluster 30 rotatably disposed on a counter shaft 31. The gear cluster 30 comprises additional gears 32, 33 and 34 of successively decreasing diameters. A gear 35 is rotatably disposed on the shaft 19 and is constantly in mesh with the gear 32. A gear 36 is slidably splined on a hub portion 37 of the shaft 19, and the gear 36 is adapted to be moved into mesh with the gear 33 when moved forwardly on the transmission. An idler gear 38 is provided which is permanently in mesh with the gear 34, and the gear 36 may also be moved into mesh with the idler gear 38.

Positive clutch mechanism 39 is provided for connecting either the gear 28 or the gear 35 with the shaft 19, and this clutch mechanism comprises a sleeve 40 slidably splined on a hub portion 41 fixed to the shaft 19. The gear 28 is provided with clutch teeth 42, and the gear 35 is provided with clutch teeth 43 with which the sleeve 40 may engage depending on its direction of movement. Synchronizer rings 44 are provided between the clutch sleeve 40 and each of the gears 28 and 35, and each of the rings is provided with blocker teeth 45. The synchronizer rings 44 are of conventional construction and function to synchronize the sleeve 40 with either of the sets of teeth 43 or 42 depending on the direction of movement of the sleeve 40, and the teeth 45 on these rings function to prevent engagement of the sleeve 40 with the teeth 42 or 43 until substantial synchronism has been attained between the sleeve 40 and the teeth 42 and 43 with which it is about to mesh.

The intermediate shaft 19 constitutes the output shaft of the three speed and reverse portion of the transmission and a gear 46 is fixed on the shaft 19 to constitute an output gear. A gear cluster 47 is rotatably disposed on a countershaft 48 fixed in the housing 49 of the transmission. The cluster 47 comprises a relatively large gear 50 and a relatively small gear 51, and the gears 52 and 53 are rotatably disposed on the shaft 11 which is journalled in the transmission housing 49 and are respectively in mesh with the gears 50 and 51. The gear 52 is smaller than the gear 53, as shown, and is the same size as the gear 46. Clutch mechanism 54 is provided for connecting either of the gears 52 and 53 with the shaft 11, and this clutch mechanism comprises a clutch sleeve 55 slidably splined on a hub 56 fixed to the shaft 11 by means of internal splines 57 in the sleeve. The gear 52 is provided with clutch teeth 58, and the sleeve 55 is adapted to be moved to engage the teeth 58 by means of its internal splines 57 for connecting the gear 52 with the shaft 11. The gear 53 is provided with internal clutch teeth 59 adapted to be engaged by external clutch teeth 60 provided on the sleeve 55 when the sleeve is moved toward the gear 53 for the purpose of connecting the gear 53 to rotate with the driven shaft 11.

Conventional synchronizing mechanism is used for the clutch mechanism 54 and comprises synchronizing rings 61 and 62 each provided with blocker teeth 63. A plurality of thrust bars 64 (only one being shown in Fig. 4) are provided, each having a projection 65 fitting in a corresponding recess 66 in the sleeve 55 and acted on by annular springs 67. The thrust bars 64 are provided for acting on the synchronizer rings 61 and 62 when the collar 55 is moved in one direction or the other for engaging the teeth 58 or 59 and for moving the rings 61 and 62 onto tapered synchronizing surfaces 68. The synchronizing mechanism used in connection with the shift sleeve 55 is quite similar to that shown in the patent to Bruce A. Barr, No. 2,221,901, issued November 19, 1940, and hence further description of it is deemed unnecessary.

A one-way clutch 69 is provided for connecting the shaft 12 with the shaft 11. The one-way clutch is of conventional construction and comprises a hub 70 splined to the shaft 12 and having slanted lands 71 on it and an annular member 72 splined to the shaft 11 and having an internal cylindrical surface 73. Rollers 74 are provided between the lands 71 and the cylindrical surface 73 and wedge between the members 70 and 72. A roller carrier 75 having an opening for each of the rollers 74 is provided for holding the rollers spaced with respect to each other, and a circular spring 76 is provided within the carrier 75 and is anchored at one end with respect to the hub 70 and at its other end to the carrier 75 and tends to move the rollers 74 into engaging position between the cylindrical surface 73 and the lands 71.

A lock up clutch 77 is provided for locking the parts 70 and 72 together for a two-way drive therebetween. The clutch comprises a sleeve 78 slidably splined on the member 72 and engageable with clutch teeth 79 formed on the member 70.

The gear 36 and the shift collar 40 are shifted by conventional mechanism including a manually operated shift lever 90 which is universally mounted at 91 in a portion of the transmission casing 49. A shift fork 92 is disposed in a groove 93 provided in the gear 36, and a shift fork 94 is disposed in a groove 95 in the shift collar 40. The shift fork 94 is carried by a shift rail 96, and the shift fork 92 is carried by a shift rail 97. The fork 92 and the rail 96 are each provided with a notch 98, and the lower end of the shift lever 90 is in a ball-like form and is adapted to enter into either of the notches 98 when the gear 36 and the shift sleeve 40 are in their neutral positions in which they are illustrated in Fig. 1.

The shift collar 55 is shifted between its various positions by means of a shift lever 99 oscillatably mounted with respect to the transmission case 49 by means of a shaft 100. A shift fork 101 is disposed in a groove 102 in the collar 55 and is fixed on a shift rail 103 slidably disposed in the transmission case 49. The shift rail 103 is provided with a slot 104 therein and the rounded end 105 of the shift lever 99 fits in the slot 105.

A shift fork 106 disposed in a groove 107 in the sleeve 78 is provided for shifting the sleeve. The fork 106 is slidably disposed on a shift rail 108 which in turn is slidably disposed in the transmission case 49. Movement of the shift fork 106 on the rail 108 is limited by a collar 109 fixed on the rail, and a spring 110 is provided between another collar 111 and the shift fork 106 for holding the fork 106 against the collar 109.

The shift fork 106 and the rail 108 move in accordance with movements of the shift fork 92 and shift rail 97, and the shift forks and rails are connected by means of another shift rail 112 slidably mounted in the transmission case 49. The shift rail 112 has a slot 113 therein for receiving a portion of the shift fork 92, whereby the rail 112 moves with the fork 92. A lever 114 is pivotally mounted on a bolt 115 fixed to the transmission case 49. The lever 114 at one end extends into a slot 116 provided in the rail 112, and the lever 114 at its other end extends into a slot 117 provided in the shift rail 108.

A governor mechanism 118 is provided for blocking movement of the shift rail 103 from its "neutral" or "direct" positions to its "underdrive" position, all of which are indicated in Fig. 7, above a predetermined speed of the driven shaft 11. The governor mechanism comprises a fly weight type mechanical governor 119 which includes a rotatable shaft 120 driven in timed relationship with the driven shaft 11 of the transmission. The shaft 120 is driven from the shaft 11 by means of a gear 121 fixed on the shaft 11 and a gear 122 fixed on the shaft 120 and in mesh with the gear 121. A collar 123 is pinned on to the shaft 120, and a collar 124 is slidably disposed on the shaft 120. A pair of weights 125 are pinned to the fixed collar 123, and a pair of links 126 are pinned to the movable collar 124 and respectively with the weights 125 as shown. The links 126 are disposed in slots 127 formed in the movable collar 124, and a guide pin 128 is fixed in the shaft 120 and extends into the slots 127 for preventing any substantial rotation of the collar 124 with respect to the shaft 120. A spring 129 is provided between the collars 123 and 124 for yieldably holding the collars in their spaced relation with the links 126 and weights 125 lying on straight lines substantially as shown in Fig. 6. The movable collar 124 carries a detent ball 130 slidably disposed in a cavity 131 in the collar 124 which ball lies in a groove 132 formed in the shaft 120 when the collar 124 is in its Fig. 6 position. A spring 133 is disposed in the cavity 131 and yieldably holds the ball 130 in the groove 132.

A blocker lever 134 pivotally mounted on a shaft 135 is movable into the path of movement of the shift rail 103. The movable collar 124 is provided with a circumferential groove 136 therein, and a rounded end portion 137 of the lever 134 extends into the groove 136, so that movement of the collar 124 is effective to move the blocker lever 134.

In operation, the output shaft 19 for the three forward speed and reverse drive portion of the transmission is driven in any one of these drives with different positions of the gear 36 and the shift collar 40. The shaft 11 constituting one of the driven shafts of the transmission is driven from the shaft 19 at either a one to one drive or at an underdrive with respect to the shaft 19 depending on the position of the shift collar 55. The driven shaft 12 of the transmission connected with the front wheels 17 of the vehicle is driven from the shaft 11 either through the one-way clutch 69 or positive type clutch 77.

For a first or low speed forward drive of the intermediate shaft 19, the gear 36 is moved from its neutral position in which it is illustrated in Fig. 1 into engagement with the gear 33. The clutch 14 is then engaged by allowing the collar 27 to move rearwardly of the transmission, that is, to the right as seen in Fig. 1, under the influence of the clutch springs 24, so that the clutch disc 21 is engaged between the pressure plates 22 and 23. The drive is then from the engine 13 through the clutch 14 to the drive shaft 10, through the gears 28 and 29, the gear cluster 30 and the gears 33 and 36 to the hub 37 and shaft 19.

A second or intermediate speed forward drive of the intermediate shaft 19 may be obtained by engaging the clutch sleeve 40 with the clutch teeth 43. The gear 36 is moved back to its neutral position in which it is illustrated in Fig. 1 for breaking the low speed power train. The synchronizer 44 with its blocker teeth 45, which is located between the sleeve 40 and teeth 43, functions to synchronize the speeds of rotation of the teeth 43 and the shift collar 40 and to block engagement of the shift collar 40 with the teeth 43 until such synchronism in rotation is attained, this function of the blocker type synchronizer 44 being in accordance with the well known principles of operation of such synchronizers. As will be understood with this completion of drive as well as for any other changes in drive through the transmission, the clutch 14 is preferably disengaged so as to break any drive between the shafts 10 and 19 and is subsequently reengaged. Intermediate speed drive is from the engine 13 through the clutch 14, the drive shaft 10, the gears 28 and 29, the gear cluster 30, the gears 32 and 35, the teeth 43, the sleeve 40 and the hub 41 to the shaft 19.

A third forward speed or direct drive is completed between the shafts 10 and 19 by moving the clutch collar 40 to the left as seen in Fig. 1 into engagement with the teeth 42. The synchronizer 44 between the hub 41 and teeth 42 functions similarly to the other synchronizer 44 in preventing engagement of the clutch sleeve 40 with the teeth 42 until the speeds of rotation of these two parts are substantially the same. The sleeve 40 when engaged with the teeth 42 completes the direct drive, the drive being from the engine 13 through the clutch 14, the shaft 10, the teeth 42, the clutch collar 40 and the hub 41 to the shaft 19.

The reverse power train between the shafts 10 and 19 is completed by moving the gear 36 into engagement with the idler gear 38, and the reverse power train is from the engine 13 through the clutch 14, the drive shaft 10, the gears 28 and 29, the gear cluster 30, the gears 34 and 38 and 36, and the hub element 37 to the driven shaft 19.

The driven shaft 11 connected with the rear road wheels 15 of the vehicle is driven either in a one to one direct drive or in an underdrive with respect to the shaft 19 when the latter is driven in any of its three forward drives or in its reverse drive with respect to the drive shaft 10. This change in drive between the shaft 19 and the shaft 11 is accomplished by shifting the shift collar 55 in one direction or the other as seen in Fig. 4, for example, and the change speed gearing providing both this direct drive and underdrive comprises the gears 50, 51, 52, and 53. The gear 50 is driven by the gear 46 on the shaft 19, and it will thus be apparent that the direct drive and underdrive gearing is connected in series or tandem with the three speed forward and reverse gearing for driving the shaft 19 which is illustrated in Fig. 1. Thus there will be six different power trains of different speed ratio in forward drive between the shaft 10 and the shaft 11, and there will be two power trains of different speed ratio in reverse drive between the shafts 10 and 11.

The shaft 11 is driven in direct drive with respect to the shaft 19 by moving the shift collar 55 from its neutral position in which it is illustrated in Fig. 4 into engagement with the teeth 58 formed on the gear 52. The synchronizer 61 is of the same type as the synchronizers 44 and functions in substantially the same manner. When the shift collar 55 is in engagement with the teeth 58, the drive will be from the shaft 19 through the gears 46, 50, and 52, the shift collar 55 and the hub 56 to the driven shaft 11. It will be observed that the gears 52 and 46 are of equal size, and the gear 50 between them functions simply as an idler gear, so that the gear 52 will rotate at the same speed as the gear 46, and the shaft 11 will thus be driven at the same speed and in the same direction as the shaft 19. The underdrive speed ratio power train between the shafts 19 and 11 is completed by moving the shift collar 55 to the right as seen in Fig. 4 to engage the teeth 60 with the teeth 59. The synchronizer 62 functions similarly to the synchronizers 61 and 44 and prevents an engagement of the teeth 60 with the teeth 59 until there is substantial synchronism between the teeth 60 and 59. In this case, however, it will be observed that the blocker teeth 63 are not effective on the actual power transmitting clutch teeth 60 but rather on the internal teeth 57 in the sleeve 55. When engagement of the teeth 60 and 59 has been completed, the underdrive power train from the shaft 19 to the shaft 11 is through the gears 46 and 50, the gear cluster 47, the gears 51 and 53, the clutch sleeve 55 and the hub 56 to the shaft 11. Since the gear 50 is larger than the gear 46 and the gear 53 is larger than the gear 51, the gear 53 will be driven slower than the gear 46 and the underdrive power train will be effective.

It is contemplated that the shaft 12 will be driven in all forward speed drives from the shaft 11 through the one-way coupling device 69 and that the clutch sleeve 78 shall be disengaged from the teeth 79 for all of these drives. For either of the reverse drives, when the clutch sleeve 55 is either in its direct drive position or in its underdrive position, it is contemplated that the clutch sleeve 78 shall preferably be in engagement with the teeth 79 for the purpose of driving the driven shaft 12 from the driven shaft 11, so that the front wheels 17 as well as the rear wheels 15 will drive. The one-way clutch device 69 is so constructed that it is capable of driving the shaft 12 from the shaft 11 in the forward direction (for a forward drive of the vehicle), but the clutch device 69 cannot drive the shaft 12 in the reverse direction from the shaft 11, since under these circumstances, the clutch device 69 would overrun. It is apparent that the driven shaft 11 always has a two-way drive connection with the rear road wheels 15, that is, the driven shaft 11 may drive the wheels 15 or vice versa. The one-way clutch device 69 in the drive from the driven shaft 11 to the driven shaft 12 and thence to the front wheels 17 allows an overrunning or faster rotation of the front wheels 17 with respect to the rear wheels 15, and such overrunning occurs when the vehicle is driven over uneven road surfaces, and any tendency for the front and rear wheels of the vehicle to drive the vehicle at slightly different speeds due to these uneven road surfaces is minimized. Such an overrunnning action does not occur in reverse drive in which the shaft 11 is connected directly with the shaft 12 by means of the positive clutch 77; however, it is contemplated that there shall not be any great amount of driving in either of the reverse drives.

Either of the forks 94 and 92 and the clutch collar 40 and gear 36 respectively shifted thereby may be moved by means of the shift lever 90. The shift lever 90 may be moved into the slot 98 in either the fork 92 or rail 96, and the particular fork 92 or 94 may then be shifted along with the respective shift rail 97 or 96. The clutch sleeve 55 may be shifted in either one direction or the other for the purpose of completing either the direct power train or the underdrive power train through the change speed gearing comprising the gears 50, 51, 52, and 53 by means of the shift lever 99 which is mounted on the shaft 100 and is disposed in the groove 105 in the shift rail 103 carrying the fork 101 for the sleeve 55.

The shift collar 78 is moved in accordance with movement of the shift rail 97 which moves along with the fork 92 and the first speed forward and reverse gear 36, for the purpose of engaging the positive clutch 77 when the transmission is conditioned for reverse drive and for disengaging this positive clutch when the transmission is conditioned for neutral or for any of its forward speed drives. The shift rail 112 has its notch 113 in engagement with the shift fork 92 as shown in Fig. 2, so that this shift rail 112 moves along with the fork. The shift rail 112 is connected with the shift rail 108 by means of the lever 114 pivoted on the bolt 115, the lever 114 being disposed in the notch 116 in the rail 112 and being disposed in the notch 117 in the rail 108. The arrangement is such that when the shift rail 97 is moved so that the gear 36 is meshed with the gear 38 for reverse drive, the lever 114 is moved counterclockwise as seen in Fig. 5 and moves the rail 108 to the right as seen in this figure. The fork 106 is moved in the same direction which is to the left as seen in Fig. 4 causing corresponding movement of the clutch collar 78 so that it meshes with the teeth 79, assuming that the splines within the clutch collar 78 and the teeth 79 are in alignment. In case this alignment does not exist, the internal splines in the collar 78 will abut against the teeth 79 and complete engagement will not be obtained and the spring 110 will be compressed. As soon as a slight relative rotation between the members 70 and 72 takes place, the internal splines in the collar 78 will mesh with the teeth 79 and the positive clutch 77 will be engaged. The positive clutch 77 will be disengaged by movement of the shift rail 97 and connected parts in opposite directions toward their neutral or low forward speed positions, and in this case positive movement of the sleeve 78 will occur due to the collar 109 on the rail 108 which will abut the fork 106 and will move it.

The speed responsive mechanism 118 is effective for preventing movement of the shift rail 103 and corresponding movement of the fork 101 and the shift collar 55 to bring the latter into its underdrive position when the speed of the driven shaft is above a predetermined value. The governor shaft 120 rotates along with the driven shaft 11 connected with the rear road wheels 15 through the gears 121 and 122, and centrifugal force on the weights 125 causes the weights to move outwardly about their pivotal connections with the fixed collar 123. The weights 125 act through the links 126 on the movable collar 124 and move the collar on the shaft 120 to the right, as viewed in Fig. 6, against the action of the spring 129. The detent comprising the ball 130 disposed in the groove 132 also functions to hold the movable collar 124 in its position as illustrated in Fig. 6 until the weights 125 exert sufficient force to move the ball 130 out of the groove 132. It will be seen that the detent provides for snap movement of the collar 124 to insure snap action of the speed responsive mechanism from inoperative to operative condition. The rounded end 137 of the lever 134 is disposed in the groove 136 in the collar 124, and the lever 134 is thus rotated in a counterclockwise direction as viewed in Fig. 6 when the weights 125 move outwardly. Assuming that the shift rail 103 is in its "neutral" or "direct" position as seen in Fig. 7, the lever 134 will move into the path of movement of the shift rail 103 and will prevent movement of the shift rail 103 from its direct or neutral positions into its underdrive position as long as the speed of rotation of the shaft 120 is sufficient to hold the weights 125 outward against the action of the spring 129. Movement of the shift rail 103 and the shift fork 101 and collar 55 into their underdrive positions is thus prevented above a predetermined speed of the driven shaft 11 and thereby a predetermined speed of the vehicle. It has been found that if such a change in drive is made above predetermined vehicle speeds, the drive shaft 10 is rotated at excessively high speeds, so that there is danger of the clutch facings 21 being thrown off of the disc 20, and hence the desirability of this mechanism for limiting such a shift to vehicle speeds less than predetermined speeds.

My improved transmission mechanism advantageously includes connections between the low speed forward and reverse shift rail 97 and the positive clutch collar 78 so that the positive clutch 77 is engaged for all reverse drives. The synchronizers 61 and 62 used in connection with the shift collar 55 assures smooth engagement of the shift collar with either of the sets of teeth 58 and 59 without clash so that a change from direct drive to underdrive in the gear change portion of the transmission comprising the gears 50, 51, 52, and 53, is possible while the vehicle is in motion. The speed responsive blocking mechanism 118 is advantageously operative to prevent a change from direct to underdrive speed ratio in the portion of the transmission comprising the gears 50, 51, 52, and 53 above a predetermined speed of the vehicle for preventing excessively rapid rotation of the clutch disc 20 with a resultant possibility that the friction facings 21 of the disc may be thrown off due to centrifugal force.

I wish it to be understood that my invention is not to be limited to the specific constructions and arrangements shown and described, except only insofar as the claims may be so limited, as it will be apparent to those skilled in the art that changes may be made without departing from the principles of the invention.

I claim:

1. In transmission mechanism for an automotive vehicle having rear road wheels and front road wheels, the combination of a drive shaft, a first driven shaft adapted for driving the rear road wheels, a second driven shaft adapted for driving the front road wheels, change speed gearing for driving said first driven shaft from said drive shaft either in a forward drive or in a reverse drive, a selector for completing either said forward drive or said reverse drive, a one-way clutch for connecting said second driven shaft with said first driven shaft for transmitting a forward drive from said first driven shaft to said second driven shaft, a positive clutch in parallel with said one-way clutch for locking up the parts of said one-way clutch for unitary rotation and for transmitting a reverse drive from said first driven shaft to said second driven shaft, and a shift linkage interconnecting said selector and said positive clutch for engaging the positive clutch when said selector is moved to complete the reverse drive from said drive shaft to said first driven shaft.

2. In transmission mechanism for an automotive vehicle having front and rear driving road wheels, the combination of a drive shaft, a first driven shaft adapted for driving the rear road wheels, a second driven shaft adapted for driving the front road wheels, change speed gearing for driving said first driven shaft from said drive shaft either in a forward or reverse drive, a one-way clutch connecting said second driven shaft with said first driven shaft for transmitting the forward drive from said first driven shaft to said second driven shaft, a positive clutch having engaging teeth for by-passing said one-way clutch for transmitting the reverse drive from said first driven shaft to said second driven shaft, a manually operable selector for completing either the forward drive or reverse drive through said gearing, and a shift linkage interconnecting said selector and said positive clutch for engaging the positive clutch when the selector is moved to complete the reverse drive through the transmission mechanism and including lost motion means permitting a completion of the movement of said selector into its position providing the reverse drive without corresponding movement of the positive clutch when the engaging teeth thereof are butt ended.

3. In transmission mechanism for an automotive vehicle having front and rear driving road wheels, the combination of a drive shaft, a first driven shaft adapted to be connected with the rear driving wheels, a second driven shaft adapted to be connected with the front driving wheels, means for providing forward and reverse drives between said drive shaft and said first driven shaft and including a shiftable element movable in one direction for the reverse drive and in the opposite direction for the forward drive, a one-way clutch connecting said second driven shaft with said first driven shaft for transmitting a forward drive from the first driven shaft to the second driven shaft, a positive clutch having toothed engaging parts and in parallel with said one-way clutch for transmitting a reverse drive from said first driven shaft to said second driven shaft, a manually operable selector for moving said shiftable element, a first shift rail connected to move with said shiftable element, a second shift rail having a fork thereon for engaging said positive clutch when moved in one direction, spring means effectively between said last named shift rail and said fork for allowing movement of the shift rail in a direction to engage the positive clutch without corresponding engagement of the clutch if the engaging parts of the clutch are butt ended, and a lever connecting said first and second shift rails whereby movement of said shiftable element toward its reverse drive position will cause corresponding engaging movement of said positive clutch and movement of said shiftable element in the opposite direction will cause corresponding disengaging movement of said positive clutch.

4. In a transmission mechanism for an automotive vehicle having rear road wheels and front road wheels, the combination of a drive shaft, a first driven shaft adapted for driving the rear road wheels, a second driven shaft adapted for driving the front road wheels, change speed gearing for driving said first driven shaft from said drive shaft either in a forward drive or in a reverse drive, a selector for completing either said forward drive or said reverse drive, a one-way clutch for connecting said second driven shaft with said first driven shaft for transmitting a forward drive from said first driven shaft to said second driven shaft, a positive clutch in parallel with said one-way clutch for bypassing said one-way clutch and for transmitting a reverse drive from said first driven shaft to said second driven shaft, and a shift linkage interconnecting said selector and said positive clutch for engaging the positive clutch when said selector is moved to complete the reverse drive from said drive shaft to said first driven shaft.

5. In a transmission mechanism for an automotive vehicle having rear road wheels and front road wheels, the combination of a drive shaft, a first driven shaft adapted for driving the rear road wheels, a second driven shaft adapted for driving the front road wheels, change speed gearing for driving said first driven shaft from said drive shaft either in a forward drive or in a reverse drive, a selector for completing either said forward drive or said reverse drive, a one-way clutch for connecting said second driven shaft with said first driven shaft for transmitting a forward drive from said first driven shaft to said second driven shaft, a positive clutch for bypassing said one-way clutch and for transmitting a reverse drive from said first driven shaft to said second driven shaft, and a shift linkage interconnecting said selector and said positive clutch for engaging the positive clutch when said selector is moved to complete the reverse drive from said drive shaft to said first driven shaft.

References Cited in the file of this patent

UNITED STATES PATENTS

| | | |
|---|---|---|
| 1,850,340 | Cowles | Mar. 22, 1932 |
| 2,043,783 | Tyler | June 9, 1936 |
| 2,107,072 | Herrington | Feb. 1, 1938 |
| 2,277,799 | Syrovy | Mar. 31, 1942 |
| 2,354,300 | Bock | July 25, 1944 |
| 2,403,378 | Kilpela | July 2, 1946 |
| 2,415,758 | Peterson | Feb. 11, 1947 |
| 2,443,084 | Rhodes | June 8, 1948 |
| 2,450,896 | Kimberly | Oct. 12, 1948 |
| 2,512,036 | Orr | June 20, 1950 |